US009923844B1

(12) United States Patent
Kret et al.

(10) Patent No.: US 9,923,844 B1
(45) Date of Patent: Mar. 20, 2018

(54) CONVEYING INSTANT MESSAGES VIA HTTP

(71) Applicant: WhatsApp Inc., Mountain View, CA (US)

(72) Inventors: Ehren A. Kret, Cupertino, CA (US); Bryan D. O'Connor, Atherton, CA (US)

(73) Assignee: WHATSAPP INC., Menlo Park, CA (US)

( * ) Notice: Subject to any disclaimer, the term of this patent is extended or adjusted under 35 U.S.C. 154(b) by 182 days.

(21) Appl. No.: 14/447,407

(22) Filed: Jul. 30, 2014

(51) Int. Cl.
  *G06F 15/16* (2006.01)
  *H04L 12/58* (2006.01)
  *H04L 29/08* (2006.01)

(52) U.S. Cl.
  CPC .............. *H04L 51/04* (2013.01); *H04L 67/02* (2013.01)

(58) Field of Classification Search
  CPC ..... H04L 63/1433; H04L 63/10; H04L 51/04; H04L 69/14; G06F 2212/171; G06F 15/16
  USPC .......................... 709/203, 206, 209; 370/328
  See application file for complete search history.

(56) References Cited

U.S. PATENT DOCUMENTS

| | | | | |
|---|---|---|---|---|
| 5,774,698 A * | 6/1998 | Olnowich | ............. | H04L 7/0338 370/366 |
| 6,631,453 B1 * | 10/2003 | Friday | ................... | G06F 3/0623 213/200 |
| 7,761,541 B1 * | 7/2010 | Morley | .................... | H04L 29/06 370/260 |
| 2011/0047597 A1 * | 2/2011 | Mahaffey | .............. | G06F 21/564 726/3 |
| 2011/0047620 A1 * | 2/2011 | Mahaffey | .............. | G06F 21/564 726/23 |
| 2012/0110174 A1 * | 5/2012 | Wootton | ............... | G06F 21/564 709/224 |
| 2012/0124219 A1 * | 5/2012 | Zhu | ......................... | H04L 67/02 709/227 |
| 2013/0007119 A1 * | 1/2013 | Zarka | ...................... | H04L 69/14 709/203 |
| 2013/0016664 A1 * | 1/2013 | Wu | ....................... | H04L 61/103 370/328 |
| 2015/0019266 A1 * | 1/2015 | Stempora | ............... | G06Q 40/08 705/4 |
| 2015/0120290 A1 * | 4/2015 | Shagalov | ................ | G10L 15/30 704/231 |
| 2015/0145680 A1 * | 5/2015 | Favier | ................. | E05B 73/0017 340/572.9 |

(Continued)

*Primary Examiner* — Tesfay Yohannes

(57) ABSTRACT

A system and methods are provided for conveying connection-oriented communications (e.g., textual messages among multiple users) via a protocol such as HTTP (Hypertext Transfer Protocol). When a device operating a communication application that features a custom application layer protocol for formatting messages for transmission cannot connect to the system hosting the application using a default protocol stack that include the custom application layer protocol, it instead connects using HTTP's chunked mode of transfer encoding. Each outgoing communication is encapsulated in a separate HTTP chunk, and communications to multiple different users may be conveyed via the one connection. Incoming communications (e.g., from the multiple users) are received as separate chunks and are unwrapped or de-encapsulated to retrieve the communication for presentation to a user.

18 Claims, 3 Drawing Sheets

(56) References Cited

U.S. PATENT DOCUMENTS

2015/0244835 A1* 8/2015 Fausak .................... H04L 67/08
                                                        709/203

* cited by examiner

Request 306
POST /chatserver/resource HTTP/1.1
Host: c.whatsapp.net
Transfer-Encoding: Chunked

FIG. 3A

Response 308
HTTP/1.1 200 Ok
Transfer-Encoding: Chunked

FIG. 3B

Chunk 312
29
<To: UserX
What time are we going to lunch?>

FIG. 3C

Chunk 313a
f
<#$# ImageUpload>

Chunk 313b
23
<media.whatsapp.com/UserA/2014July21>

FIG. 3D

CONVEYING INSTANT MESSAGES VIA HTTP

BACKGROUND

This disclosure relates to the fields of computing and communications. More particularly, a system and methods are provided for exchanging instant messages via HTTP (Hypertext Transfer Protocol).

Some network entities, operators, and service providers restrict use of particular protocols on their networks or the establishment of certain types of connections through their equipment. In particular, some applications may be permitted, such as electronic mail or web-browsing, while others are prohibited. For example, deep packet inspection may be performed by an Internet Service Provider (ISP), a firewall, a router, or some other entity, and individual packets and/or communication connections may be dropped or rejected if the inspection uncovers use of a prohibited application or protocol, or use of an application or protocol other than those specifically permitted. Thus, if a particular user's service plan allows only HTTP connections, attempts to make other connections will not be allowed.

As a result, a given device may be able to open a communication connection for some purposes, such as to send or receive an electronic mail message via an SMTP (Simple Mail Transfer Protocol) e-mail program, or to browse the world-wide web using HTTP, but not for other purposes. For example, many messaging applications (e.g., an application for exchanging chat or instant messages) use custom application layer protocols that require standard TCP connections. Attempts to open a standard TCP connection with the customer protocol may be blocked by the service provider, or the service provider may issue TCP reset messages to prevent such connections from being formed.

With the ever-expanding usage of mobile communication and computing devices, restrictions like this can be frustrating to users, especially if they can operate a preferred application from one device (e.g., a home computer) but not another (e.g., a smart phone).

SUMMARY

In some embodiments, a system and methods are provided for using HTTP (Hypertext Transfer Protocol) to conduct instant messaging.

In these embodiments, a communication application that executes on a client device and that normally uses a custom application layer protocol first attempts to establish a communication connection with the system that hosts the application (e.g., a central communication server), using a custom protocol stack that includes the customer protocol and that does not include HTTP. If a connection cannot be established with the default protocol stack, one or more alternative connection strategies may be employed.

One such strategy is to wrap or encapsulate the communications (e.g., chat messages, instant messages, electronic mail messages), as they are formatted with the custom application layer protocol, within HTTP's chunked transfer encoding. In some implementations, outgoing communications are generated normally (i.e., as if a normal communication connection has been established using the custom protocol), with the sender's desired text and addressed to the desired recipient(s), and the application client software packages and sends each communication as a separate chunk (e.g., with a POST message). The application host system unwraps each chunk and forwards the communication to the recipient(s).

Similarly, when the system receives a communication addressed to a user who is using this alternative connection method, it packages the communication as an HTTP chunk and delivers it as an HTTP response message. To allow continued communications between users, the normal end pattern of the chunked transfer encoding mode, which is a chunk of size zero, may never be sent.

DESCRIPTION OF THE FIGURES

FIGS. 3A-D depict illustrative HTTP chunks for conveying communications, in accordance with some embodiments.

DETAILED DESCRIPTION

Figure 1:
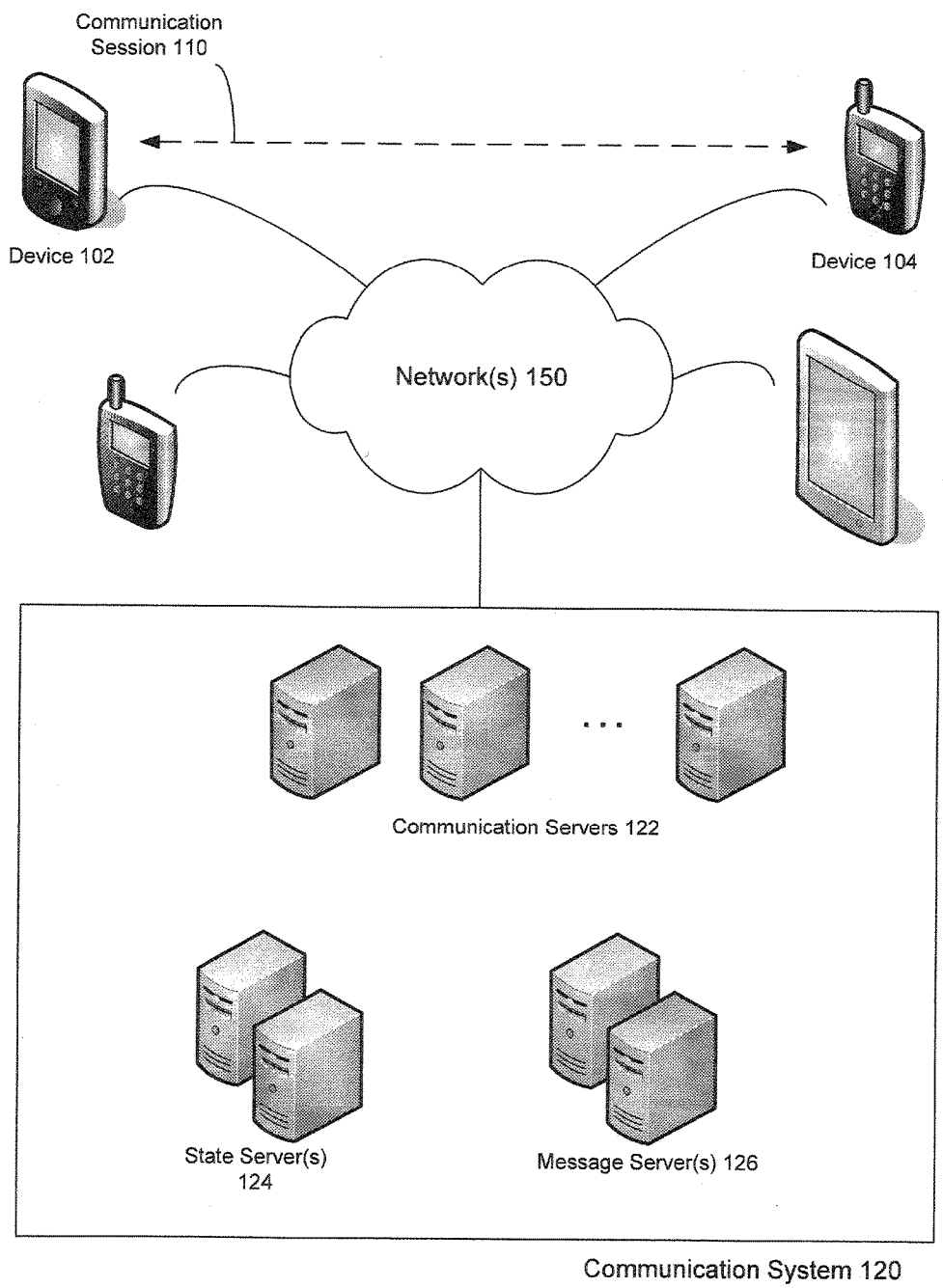
FIG. 1 is a block diagram depicting a system that hosts a communication application and that supports the exchange of instant messages via HTTP, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system and methods are provided for operating a communication application to convey connection-oriented communications with a stateless protocol such as HTTP (Hypertext Transfer Protocol) or HTTPS (Secure Hypertext Transfer Protocol). From the following description, other embodiments suitable for use with protocols other than HTTP and HTTPS may be derived.

In some embodiments, a method described herein may be incorporated into a communication application installed and operated on mobile and/or stationary computing and/or communication devices. In some particular embodiments, the application is a communication application in which text, images, audio, video, and/or other electronic information are exchanged via data communication channels conforming to an IEEE 802.11 standard (e.g., Wi-Fi® connections). For example, the application may be the WhatsApp® Messenger application provided by WhatsApp Inc.

In embodiments described below, the communication application uses the chunked transfer encoding mode of HTTP. Specifically, each individual user communication (e.g., an instant message, a post to an online discussion, an electronic mail message) and each management operation of the application (e.g., to request or provide authentication information, to identify device capabilities, to request a last login time) is called a stanza and is encoded in one HTTP chunk. In some implementations, however, multiple communications or management operations may be combined into one chunk or one communication or management operation may span multiple chunks.

In these embodiments, the communication application is hosted by one or more communication servers and/or other central resources, and client versions of the application execute on users' client devices (e.g., smart phones, portable computers, desktop computers). The application client may first attempt to connect to a communication server using a default protocol stack that includes, for example, IP (Internet Protocol) at the Network layer, TCP (Transmission Control Protocol) at the Transport level, and a custom protocol at the Application layer.

If the client device cannot establish a connection using this default protocol stack, and particularly if an error or failure message indicates that the connection was rejected or prohibited because of the format of the communication (e.g., the protocols involved in the connection attempt), the application client may try one or more alternative methods of connection, such as methods described herein in which the chunked mode of HTTP (or HTTPS) is used at the Application layer. It may be noted that the chunked mode is initiated by a client device and not a server.

With this alternative method of connection, the application client opens a socket with a web server that may or may not be co-located with a communication server, and specifies that the transfer-encoding method is chunked. Thereafter, as the user operating the client sends and receives communications, and as the application conducts transactions necessary to support operation of the application, the outgoing user communications and management operations are wrapped within chunked HTTP messages (e.g., POST messages), and incoming communications and transactions are received via chunked HTTP response messages.

Thus, despite the stateless nature of HTTP, the application can be operated with HTTP as the apparent application layer protocol to allow a user to conduct one or multiple communication sessions (e.g., chat sessions) with other users, and the application can conduct necessary management and operational transactions.

One of ordinary skill in the art will appreciate that embodiments provided below differ significantly from traditional communication schemes. For example, HTTP communications are typically simplex in nature, meaning that a client connects, transmits its request, and then indicates that its request is done; subsequently, the server replies and indicates that its response is done. Methods described herein reflect a full duplex request/response communication stream wherein a client opens a connection, issues one or more requests, leaves the connection open, and a server responds one or more times before the client's request is done. In some embodiments, the client never closes its connection.

FIG. 1 is a block diagram of a system hosting a communication application and supporting the exchange of instant messages via HTTP, according to some embodiments.

In these embodiments, users of the application hosted by communication system 120 operate a variety of portable communication/computing devices featuring the same or different operating systems (e.g., Android, BlackBerry, iOS, Nokia S40, Symbian, Windows Phone). Thus, devices 102, 104 are operated by different users, and may be configured similarly or differently in terms of functionality, applications, utilities, etc. Each of them, however, executes a client version of the communication application hosted by communication system 120.

System 120 is a data center, computer network, or other cooperative collection of computing and communication resources for hosting a communication application or service that can be used simultaneously by multiple users. As described above, in some implementations the application provides a user with communication capabilities that include (but are not limited to) instant messaging of text, audio recordings, photos, video, and multimedia from his or her device (e.g., device 102), to/from devices operated by one or more other users (e.g., device 104).

The communication application hosted by system 120 is compatible with devices 102, 104 and includes client logic executed under the devices' native operating systems. A user operating one type of device and subscribing to one communication service provider can exchange communications with users operating other types of devices and subscribing to other communication service providers.

However, one or more client devices that execute the communication application are unable to establish connections with system 120 that feature a default or preferred protocol stack that includes a custom protocol at the Application layer, TCP at the Transport layer, IP at the Network layer, and suitable Link/Data layer protocols depending on the network architecture. Illustratively, the service providers that provide Internet access to the devices may have multiple tiers or types of service plans and, in at least one of them, the devices are able to use HTTP (and HTTPS) to access the world-wide web, but are unable to use the custom Application layer protocol employed by the communication application and/or other Application layer protocols (e.g., File Transfer Protocol or FTP).

Communication servers 122 are front-end components of system 120. They host users' connections with the system and facilitate the exchange of communications between users. Servers 122 may be referred to as "chat" servers because they can receive real-time text messages and chat session communications from individual users for delivery to one or more other users. Although some messages handled by communication servers 122 may be termed "chat" messages, they are not limited to textual content and may instead (or also) contain embedded, attached, or associated (e.g., linked) media content, as well as protocol-level messages that support operation of the application.

Individual messages conveyed by the application on behalf of a sender may be sent to any number of recipients. For example, a group form of communication may be offered (e.g., group chat) in which multiple users interactively exchange instant communications and a communication sent from one user is delivered to multiple other users. Also, a user may simultaneously conduct separate communication sessions from one client device with one HTTP connection, and each session may include any number (1 or more) of other participants.

Thus, although HTTP is used as the apparent application layer protocol, a user is able to conduct multiple bi-directional connection-oriented communications, meaning that although all outgoing communications are conveyed via one HTTP connection, they may be directed to different end users, and communications from all of those end users may be delivered to the one user via the same connection.

Communication servers 122 may also act as portals to other components of system 120. Thus, when a user requests a status of another user or updates a profile or other information, for example, his or her action may be routed to the appropriate system component by the communication server with which he or she is connected.

Communication servers 122 and/or other components of system 120 may include web server modules capable of communicating with client devices via HTTP, HTTPS, and/or other protocols compatible with the world-wide web. Thus, a given communication server may simultaneously host "normal" communication connections with some users and also alternative communication connections that use the HTTP chunked mode of transfer encoding.

Illustratively, as long as a user is on-line with system 120 and the application is executing on his or her device, a connection or session (e.g., a TCP connection, a chunked HTTP connection) may be maintained between the device and a communication server 122. When the user closes the application on the device, or terminates a call, his or her connection may persist for some period of time (e.g., five minutes, fifteen minutes).

State servers 124 maintain states or statuses of users and/or users' devices. Thus, a state server stores some or all of a user's profile, including applicable preferences (e.g., preferred audible and/or visual alert, status message displayed to other users), device type/model, profile photo, geographical location or region of a user (e.g., country), etc. Some status information maintained by a state server with regard to a user may persist only for the duration of the user's current connection with system 120; other information may persist indefinitely.

Also, state servers 124 store information necessary for pushing messages to a user's device where necessary, such as a device token needed to communicate with the device via the user's service provider. This device token may also or alternatively be known as a "device URI (Uniform Resource Identifier)," a "registration id," a "PIN" (Personal Identification Number) or may have some other moniker. This token may be unique to a particular device or a particular user.

In some situations, a push message may be dispatched to the device to wake it up and cause it to connect to the system, and this token may be required by the corresponding service provider or provider of the operating system of the destination device in order to deliver the message. For example, when system 120 receives a message for a user not currently online with the system, it may cause a push notification to be dispatched to the user's device (e.g., via Google Cloud Messaging or Apple Push Notification Service), even if that user can only connect to the system via a chunked HTTP connection. The device will then wake-up, connect to the system, and either issue a request for messages or automatically receive the message when it connects.

Message servers 126 store communications that cannot immediately be delivered to their target or destination users. A new message (e.g., a chat message) received for a user who is currently on-line with system 120 can be delivered immediately (i.e., through the user's open connection with a communication server 122). However, a message received for a user who is currently off-line (i.e., does not have an open connection with a communication server 122), or at least a textual portion of such a message, may be stored on a message server 126 until it can be delivered. Media sent by one user to another may be stored on a message server or some other server (e.g., a media server not pictured in FIG. 1).

Any number (e.g., one or more) of communication servers, state servers, message servers, media servers, and/or other servers may be deployed within system 120. The functions of servers 122, 124, 126 may be distributed differently in other embodiments, such as by being merged into fewer components or divided among additional components.

Components of system 120 may be separate physical computer systems comprising distinct hardware resources (e.g., processor, storage, communication interface) and software resources (e.g., program code, data) suitable for performing the functions ascribed to them. In some alternative embodiments, any or all of the servers may be virtual computing machines that share hardware and/or software resources. Thus, multiple software server modules performing different functions (or the same function) may reside on one server computer within system 120.

Network(s) 150 provide communication paths between system 120 and users' devices, and between different user devices, and may include data and/or voice communication channels. For carrying data communications, networks 150 may comprise the Internet, one or more intranets, LANs (Local Area Networks), WANs (Wide Area Networks), and/or other point-to-point or distributed connections, which may be wired and/or wireless in nature. For carrying voice communications, network(s) 150 may comprise wired and/or wireless voice communication links managed by different telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO), and so on.

Networks 150 may thus comprise various entities not shown in FIG. 1, such as routers, gateways, switches, base stations (e.g., wireless access points, Node Bs, Evolved Node Bs), data centers of the service providers for the client devices, and/or other equipment for establishing, maintaining, switching, or otherwise manipulating a data connection.

Figure 2:
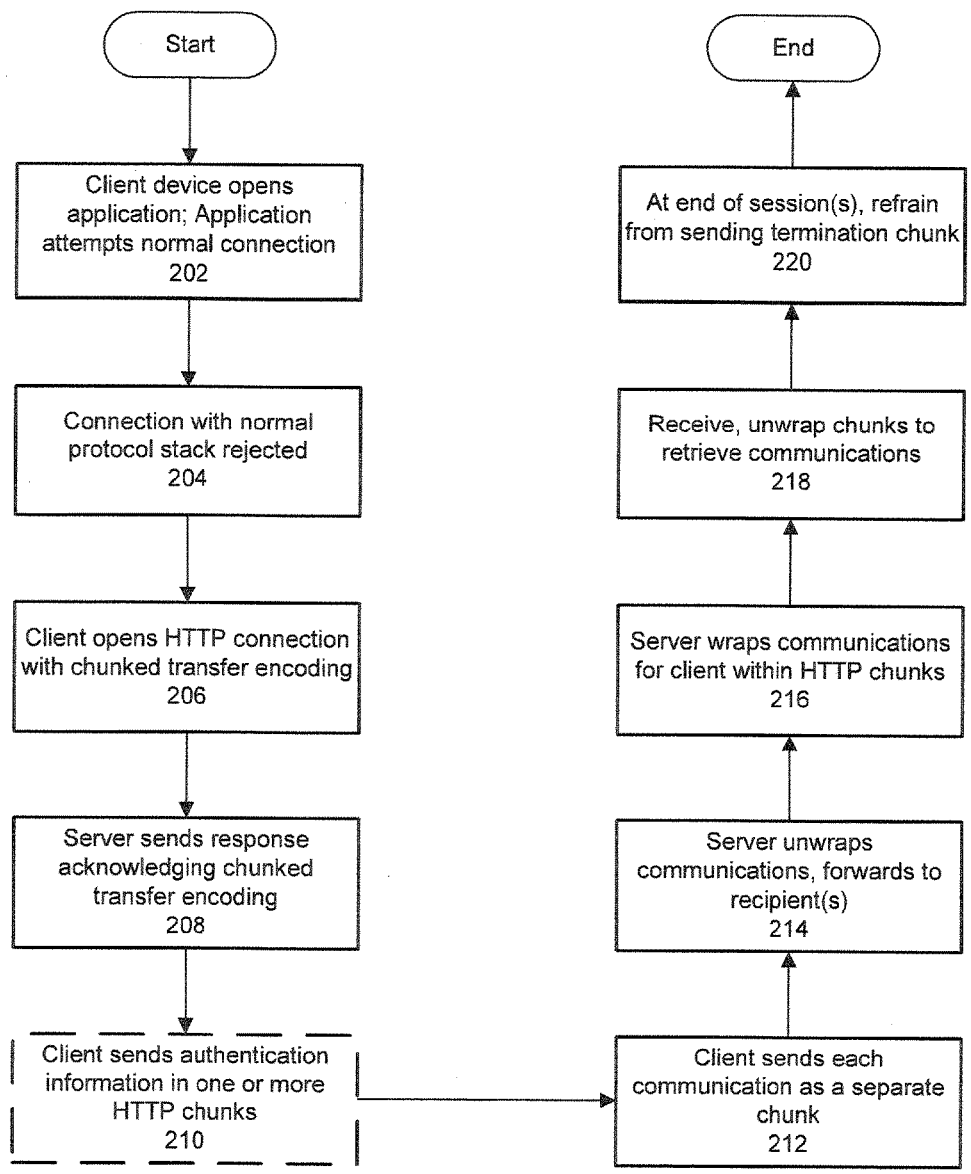
FIG. 2 is a flow chart illustrating the use of HTTP to convey connection-oriented communications, in accordance with some embodiments.

FIG. 2 is a flow chart demonstrating a method of conducting connection-oriented communications via the chunked mode of HTTP, according to some embodiments.

In operation 202, a user opens the communication application on his or her client device (e.g., a smart phone, a portable computer). The application will automatically attempt to establish a standard TCP connection with a central server (e.g., a chat server, a communication server) with a predetermined domain name, network address, port, and/or other parameters. This initial connection attempt is made using a protocol stack that includes a custom communication protocol at the application layer and not HTTP.

In operation 204, the connection attempt fails when a TCP Reset frame is received, when the connection attempt times out, or when some other condition is encountered that indicates the connection is not possible. The application may retry multiple times to open a connection with a central communication server, but no normal connection can be established even though the device appears to the communication application to have Internet access (because the device has a Wi-Fi® connection or a mobile data connection).

In operation 206, the application executing on the client tries an alternative method of connection in which the custom protocol is encapsulated within HTTP. The alternative connection attempt may involve transmission of a standard HTTP POST message that is formatted similar to the example shown in FIG. 3A.

Request 306 of FIG. 3A is an HTTP POST message that identifies the host of the communication application and a resource, and that specifies that the encoding will be chunked. Prior to sending the POST message, the application client may open a socket with a system component (e.g., a chat server), on a predetermined port (e.g., port 80), and/or take other necessary action.

In operation 208, a communication server of the system that hosts the application receives Request 306 and recognizes it as an attempt to open an alternative type of connection (i.e., a chunked HTTP connection). The server responds with a message that may be similar to Response 308 of FIG. 3B, which acknowledges the connection and the use of chunked encoding.

In some embodiments, all client devices that connect to the system via this alternative method specify the same resource and host name. In other embodiments, different clients may cite different hosts and/or resources (e.g., depending on geographical area, language, device platform). Also, all messages sent by a user during use of this alternative connection may be directed to the same endpoint on the chat server or other system component that hosts the connection.

In optional operation 210, the client sends one or more chunks containing authentication information. This information may be sent in response to a request from the communication server or may be sent automatically without being requested. In accordance with the HTTP chunked mode, the authentication information may be formatted as a BLOB (Binary Large Object) containing a username (or other user identifier), password (or other code), and/or other data or authenticating the user and/or his/her device.

In some embodiments, the communication application provides sufficiently robust authentication and/or encryption that there is no need for authentication and/or encryption schemes offered by HTTP/HTTPS.

In operation 212, the application on the client device transmits one or more communications generated by the user and directed to one or more recipients (e.g., one communication for each message composed by the user). Each communication is encapsulated within a separate HTTP chunk, regardless of its size or content. In some alternative embodiments, however, multiple communications may be combined in one chunk or one communication may span multiple chunks.

In the illustrated embodiment, the communications are sent in binary form (e.g., as BLOBs). Thus, in this embodiment an outgoing textual communication (e.g., a chat message) is encoded in binary, the size or length of the communication is determined and noted in hexadecimal form, and a chunk is transmitted that includes the length of the communication (in hexadecimal) and the communication itself (in binary).

Chunk 312 of FIG. 3B demonstrates a simple communication sent from the current user to one or more recipients. Angle brackets "<" and ">" signify that the enclosed text is displayed in human-readable form for purposes of this discussion, but would actually be sent in binary form. The angle brackets are not part of the communication. Similarly the hexadecimal length 29 indicates that the length of the communication as displayed in FIG. 3B is forty-three characters (and includes the CR and LF between the two lines of text), but would actually indicate the length of the communication after it is placed in binary form (e.g., the total number of bytes).

It may be noted that each communication includes the text of the sender's message and also metadata such as an identifier of the recipient(s) of the message. Other metadata may also be included, such as a timestamp, an identifier of the sender, etc.

In some embodiments, some or all communications are encrypted. In these embodiments, an application client first generates the binary form of a user's outgoing communication, then encrypts it with a specified key, determines the length of the encrypted communication, and formats the chunk accordingly. Alternatively, the plain text of an outgoing communication may first be encrypted and then encoded in a binary format.

When the user sends an image, a video clip, an audio clip, or some other media content as or as part of a communication, the application will send a chunk that conveys a management operation indicating that the user is sending media to someone. For example, the content of the chunk may begin with a special sequence of characters that indicates that the chunk contains a management operation, followed by an identifier of the operation; the chunk will, of course, begin with a hexadecimal value indicating the size of the chunk.

The system will respond with a chunk comprising an acknowledgement of the action and a URL (Uniform Resource Locator), address, or other indicator of where to store (e.g., upload) the media, which may be a different component of the system than the communication server to which the HTTP chunks are sent (e.g., a media server). The application client will then send the media to the specified location with an HTTP POST message (which may or may not be chunked) or other suitable communication.

Chunks 313a, 313b illustrate this type of exchange. Chunk 313a conveys an illustrative management operation ImageUpload, indicating that the user wants to send an image as or as part of a message, preceded by an indicator (i.e., "#$#") that the chunk contains a management operation. Chunk 313b is the response, which provides a URL to which the user's device is to post the image. As described above, the angle brackets are not part of the communications, but rather indicate that the contents would be converted to binary before being sent, and the preceding size entries would also actually indicate the length of the binary contents.

In operation 214, as the system (e.g., a chat server) receives each of the user's outgoing communications, in chunked form, it unwraps the chunk to retrieve the communication, reformats it if/as necessary, and forwards it to the specified recipient(s). A recipient may receive the message almost immediately, if his or her device is currently connected to the system, or the message may be temporarily stored (e.g., on a message server) until the recipient connects. A message may be pushed to the recipient's device to cause it to wake-up and connect to the system.

In operation 216, the system (e.g., a chat server) receives from another user a communication for the current user, as part of a current session between the users, or as part of a new session. The server notes that the current user is connected via an alternative connection method, and therefore wraps the communication within an HTTP chunk and sends it to the user's device via an HTTP response message.

In some embodiments, communication/chat servers maintain some state information regarding connected users/devices. In particular, the servers note whether a given user/device is connected via an alternative connection method, such as the encapsulated or chunked HTTP mode described here.

Advantageously, other users (and their client devices) need not know that a given user is connected with a chunked HTTP connection. The host system handles each communication appropriately and ensures it is formatted accordingly when forwarded to a recipient.

Thus, if a recipient of a communication received in operation 214 is also connected via this mode, the system may forego unwrapping the communication and may instead forward it to the recipient in the same form, or virtually the same form, in which it was received. Or, the system may unwrap it (e.g., to identify the recipient(s)) and then re-wrap it for delivery.

In operation 218, the application client operated by the current user receives a chunked communication from the system, and unwraps it to retrieve the communication and display it for the user. The communication may be a simple text message, a management operation, or may be (or include) a link to a media file stored on the system. In the latter case the file may be downloaded automatically or the user may be presented with a link or message regarding the file and it may only be downloaded when he or she clicks or taps on it (or takes other similar action).

Illustrative management operations that may be delivered to a client device via HTTP chunks include creation of a group (e.g., by another user), group membership changes, notification that a contact has logged in or started using the communication application, an update to a "last seen time" or some other status update regarding a contact, etc.

In embodiments in which communications are formatted according to the custom application layer protocol of the application and then encapsulated within HTTP chunks, operation 218 may involve extracting from each chunk the normal form of each incoming communication (e.g., as it would have been received if a normal connection had been established instead of the alternative form of connection).

In operation 220, when a user closes the application on his or her device, a final message may be sent by the application client to the host system to indicate that the application client is terminating. This may cause the host to tear down the connection (immediately or after some delay). Notably, however, in some embodiments of the invention the normal final HTTP chunk of size zero is not sent. Therefore, even after the user has finished sending all desired messages, and the device sends no more request messages, until the system tears down the connection it may still send an unsolicited chunked response message if, for example, someone else sends the user a message.

In some embodiments, a given client device may alternate between chunked connections and unchunked connections with the application host system. For example, the device may use a cellular connection at one time and then switch to a Wi-Fi connection, and vice versa.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method comprising:
   attempting, by a mobile communication device, to open a custom bi-directional communication connection with a communication server, the custom communication connection including a custom application layer protocol;
   receiving an error message from the communication server indicating that the connection attempt is rejected due to the use of the custom application layer protocol;
   operating, by the mobile communication device, in response to the error message, an application to establish a communication connection with the communication server, using a chunked mode of transfer encoding of Hypertext Transfer Protocol (HTTP), wherein the application provides instant communications between users of the application;
   formatting a communication from the application according to the custom application layer protocol employed by the application;
   wrapping the communication in an HTTP chunk;
   transmitting the HTTP chunk on the communication connection established in response to the error message;
   de-encapsulating a new HTTP chunk received from the communication server to retrieve a new communication from a second device; and
   operating the application to present the communication to a user of the device.

2. A non-transitory computer-readable medium storing instructions that, when executed by a processor of a client device operated by a first user, cause the processor to perform a method comprising:
   attempting, by the client device, to open a custom bi-directional communication connection with a communication server, the custom communication connection including a custom application layer protocol;
   receiving an error message from the communication server indicating that the connection attempt is rejected due to the use of the custom application layer protocol;
   opening, by the client device, in response to the error message, a chunked mode Hypertext Transfer Protocol (HTTP) connection with the communication server;
   for a communication generated by the first user and addressed to a plurality of other users:
      formatting the communication according to the custom application layer protocol;
      wrapping the communication in an HTTP chunk;

transmitting the HTTP chunk on the communication connection established in response to the error message;
receiving one or more incoming HTTP chunks from the communication server, each said incoming HTTP chunk comprising a separate communication addressed to the first user;
encapsulating the communication comprising the textual message within a new HTTP chunk;
de-encapsulating the one or more incoming HTTP chunks received from the communication server to retrieve a new communication from a second device; and
operating the application to present the communication to a user of the client device.

3. The medium of claim 2, further storing instructions for, prior to said establishing:
attempting to establish a communication connection between the mobile communication device and the communication server without using HTTP.

4. The medium of claim 2, wherein said encapsulating comprises:
receiving from a user of the mobile communication device a textual message directed to a first recipient;
encrypting the textual message;
converting the textual message into binary; and
determining a length of the encrypted and converted textual message.

5. The medium of claim 4, wherein said encapsulating further comprises:
adding an identity of the first recipient to the textual message.

6. The medium of claim 4, wherein:
the textual message is directed to multiple recipients, including the first recipient;
encapsulating the communication comprising the textual message within a new HTTP chunk; and
transmitting the new HTTP chunk to the at least one recipient;
wherein the at least one recipient is connected to the communication server with a connection featuring the chunked mode of transfer encoding of HTTP.

7. The medium of claim 2, further storing instructions for:
terminating the connection between the mobile communication device and the communication server without sending a final HTTP chunk of size zero.

8. The medium of claim 7, wherein said terminating comprises:
constructing a message in the custom application layer protocol to expressly terminate the connection; and
conveying the constructed message via an HTTP chunk.

9. A method comprising, at a client device operated by a first user:
attempting, by the client device, to open a custom bi-directional communication connection with a communication server, the custom communication connection including a custom application layer protocol;
receiving an error message from the communication server indicating that the connection attempt is rejected due to the use of the custom application layer protocol;
opening, by the client device, in response to the error message, a chunked mode Hypertext Transfer Protocol (HTTP) connection with the communication server;
for a communication generated by the first user and addressed to a plurality of other users:
formatting the communication according to the custom application layer protocol;
wrapping the communication in an HTTP chunk;
transmitting the HTTP chunk on the communication connection established in response to the error message;
receiving one or more incoming HTTP chunks from the communication server, each said incoming HTTP chunk comprising a separate communication addressed to the first user;
de-encapsulating the one or more incoming HTTP chunks received from the communication server to retrieve a new communication from a second device; and
operating the application to present the communication to a user of the client device.

10. The medium of claim 2, wherein:
the communication connection is an HTTP connection opened by the mobile communication device; and
the new HTTP chunk is transmitted to the mobile communication device before the HTTP connection is closed by the mobile communication device.

11. A system comprising:
multiple mobile communication devices, each device comprising a non-transitory computer readable medium and a hardware processor circuit, the medium storing:
bi-directional communication logic configured to cause the corresponding hardware processor circuit to attempt to open a custom bi-directional communication connection with a communication server, the custom communication connection including a custom application layer protocol, receive an error message from the communication server indicating that the connection attempt is rejected due to the use of the custom application layer protocol, to operate, in response to the error message, an application to establish a communication connection between the device and a communication server, using a chunked mode of transfer encoding of Hypertext Transfer Protocol (HTTP), wherein the application provides instant communications between users of the application;
encapsulation logic configured to cause the corresponding hardware processor circuit to format a communication from the application according to the custom application layer protocol employed by the application and wrap the communication in an HTTP chunk;
encapsulating the communication comprising the textual message within a new HTTP chunk;
a network interface configured to transmit the HTTP chunk on the communication connection established in response to the error message, and to receive a new HTTP chunk from the communication server; and
de-encapsulation logic configured to cause the corresponding hardware processor circuit to de-encapsulate the new HTTP chunk to retrieve a new communication from a second device, wherein
the corresponding processor circuit is configured to operate the application to present the communication to a user of the device.

12. The system of claim 11, wherein:
the communication connection is an HTTP connection opened by the device; and
the new HTTP chunk is transmitted to the device before the device closes the HTTP connection.

13. The system of claim 11, wherein the non-transitory computer readable medium of each device further stores instructions that, when executed, cause the device to:

prior to establishing the connection with the chunked mode of transfer encoding of HTTP, attempt to establish a communication connection between the device and the communication server without using HTTP.

14. The system of claim 11, wherein said encapsulating comprises:
   receiving from a user of the device a textual message directed to a first recipient;
   encrypting the textual message;
   converting the textual message into binary; and
   determining a length of the encrypted and converted textual message.

15. The system of claim 14, wherein said encapsulating further comprises:
   adding an identity of the first recipient to the textual message.

16. The system of claim 14, wherein:
   the textual message is directed to multiple recipients, including the first recipient;
   encapsulating the communication comprising the textual message within a new HTTP chunk; and
   transmitting the new HTTP chunk to the at least one recipient;
   wherein the at least one recipient is connected to the communication server with a connection featuring the chunked mode of transfer encoding of HTTP.

17. The system of claim 11, wherein the non-transitory computer readable medium of each device further stores instructions that, when executed, cause the device to:
   terminate the connection between the device and the communication server without sending a final HTTP chunk of size zero.

18. The system of claim 17, wherein said terminating comprises:
   constructing a message in the custom application layer protocol to expressly terminate the connection; and
   conveying the constructed message via an HTTP chunk.

* * * * *